United States Patent [19]

Palcic et al.

[11] Patent Number: 4,700,298
[45] Date of Patent: Oct. 13, 1987

[54] DYNAMIC MICROSCOPE IMAGE PROCESSING SCANNER

[76] Inventors: Branko Palcic, 6012 Adera Street, Vancouver, British Columbia, Canada, V6M 3J4; Bruno Jaggi, 2180 Trafalgar Street, Vancouver, British Columbia, Canada, V6K 4M8; Jan Nordin, 924 Leovista, North Vancouver, British Columbia, Canada, V7R 1R2

[21] Appl. No.: 650,512

[22] Filed: Sep. 14, 1984

[51] Int. Cl.$^4$ .................. G06F 15/42; G06G 7/60; G01N 33/48; G06K 9/00
[52] U.S. Cl. .................. 364/414; 364/416; 382/6; 356/39
[58] Field of Search .................. 364/414, 416; 356/39; 358/903; 377/10; 382/6, 18; 324/71.4

[56] References Cited

U.S. PATENT DOCUMENTS

| | | | |
|---|---|---|---|
| 3,908,078 | 9/1975 | Auerbach et al. | 382/6 |
| 4,061,914 | 12/1977 | Green | 356/39 |
| 4,125,828 | 11/1978 | Resnick et al. | 364/416 X |
| 4,232,970 | 11/1980 | Sawamura et al. | 382/6 X |
| 4,513,438 | 4/1985 | Graham et al. | 356/39 X |
| 4,523,278 | 6/1985 | Reinhardt et al. | 364/413 |

*Primary Examiner*—E. A. Goldberg
*Assistant Examiner*—Patrick W. Foster
*Attorney, Agent, or Firm*—Christie, Parker & Hale

[57] ABSTRACT

An image scanner for microscopic objects. The image scanner has a microscope with a high precision computer controlled motor driven stage to provide X,Y plane displacements in order to scan microscopic objects under the microscope. There is an image sensor and a digitizer in association with the microscope to sense a horizontal image line or a two dimensional image and provide a digital representation of the line or image. A digital signal processor processes digitized signals from the sensor. There is a computer to control the mechanical and electronic scanning and to store and display information from the digital signal processor. Methods of scanning a microscopic object are also described. The methods comprise positioning the object on a motorized stage of a microscope having an image sensor in a focal plane. The object is scanned and signals received from the sensor during scanning are digitized. The digitized signals are processed with a digital signal processor in order to automatically recognize objects while the sample is being scanned. The processed information contained in the signals and the location coordinates of objects are stored. The methods include automatical revisiting of recognized objects for further analysis.

15 Claims, 4 Drawing Figures

DYNAMIC MICROSCOPE IMAGE PROCESSING SCANNER

FIELD OF THE INVENTION

This invention relates to an image scanner for live cells growing in tissue culture flasks and to a method of scanning and recognizing live cells using the scanner. The scanner may be described as a dynamic microscope image processing scanner.

DESCRIPTION OF THE PRIOR ART

In many biological and medical applications it is often necessary to use a microscope in search of live cells growing in tissue culture dispersed in two or three dimensional space at very low densities. In most cases, particularly when examining live clonogenic cells, the cells are relatively far apart from each other, that is with relatively large empty spaces between them. In the case of clonogenic cells this allows them to grow without interference from each other. In these and other similar situations, one looks into predominantly empty space and thus the search and recognition of objects of interest becomes time consuming.

For many applications in cell biology and medicine, it is essential that examination of cells be done quickly, for example in a few minutes, without interfering with the cells abilities to divide and proliferate, or to perform other cellular functions. Thus exposure of cells to various physical and chemical procedures must be kept to a minimum. For example the movement of samples must be smooth, with a minimum of acceleration, to prevent cell dislocation. Exposure to light for prolonged time or to high light intensities can also affect cell properties. Cell staining, with the possible exception of a few vital fluorescence stains, is not possible if one is to observe unperturbed live cells.

Most biological and medical applications require observation and classification of a large number of cells to obtain data with sufficiently high statistical accuracy for the information to be representative of the whole population. In most instances, several thousand cells must be observed, i.e. located and characterized, in a few minutes. This is beyond the reach of human ability so that some form of automation is required.

At present there are no systems capable of the automatic detection of live, unstained cells growing at low density in a large area. Although a few systems that are used in image cytometry and some interactive television based image analysis systems could be modified for such purposes these systems would have several disadvantages in comparison to the approach adopted in the present invention. Large areas must be scanned at high speed and with high accuracy. This is best done by using a high horizontal (e.g. X-axis of image) image resolution of one micron or less and a low vertical (e.g. Y-axis of image) image resolution 5 to 10 microns, which is, achieved with the present invention employing a linear solid state image sensor array, a microscope precision stage and line by line analysis using a high speed digital signal processor.

SUMMARY OF THE INVENTION

Accordingly, it its first aspect, the present invention is an image scanner for live cells growing in tissue culture comprising a microscope; a high precision motor driven microscope stage, to provide mechanical X,Y scanning of the microscopic objects; an image sensor in association with the microscope to sense and scan electronically a horizontal image line; a sample & hold and A/D circuitry to digitize the signal from the sensor; a high speed digital signal processor to process digitized signals from the sensor; and a host computer to control mechanical and electronic scanning as well as to control the digital signal processing functions and the autofocus. This computer also stores and displays information from the various system components.

The image scanner of the invention is a versatile system useful for automatic search and recognition of live cells growing in tissue culture that can be characterized by optical properties. The system is particularly useful for locating live, unstained cells growing at low densities in tissue culture vessels. Large areas can be scanned in a short time (few minutes) and cells can be recognized, characterized and precisely located in space without affecting their viability. Subsequent observations of previously identified cells or other objects can also be done automatically with the same system.

Preferably the image sensor is mounted on the camera port of a microscope, where it senses and scans electronically a horizontal image line (e.g. X-axis of image); the vertical displacement (e.g. Y-axis of the image) of the microscope image is provided by the Y movement of the microscope stage. In this way a vertical band is scanned. In order to cover a large area several such bands are scanned. Additionally the sensor can be moved across the magnified microscope image of a local area without moving the stage for high image resolution scans. Signals from the sensor are digitized and then processed by the digital signal processor. The computer may be a host personal computer and is used for programmed operations and for storage and display of processed data.

In preferred aspects of the invention the apparatus includes a high resolution television camera with display, may include an optical memory disk record and/or a photomultiplier with a readout.

Live-cells are recognized by analyzing digitized line signals from the image sensor. If extracted coarse features of the measured line signal of an object match the cell characteristics, then the object is identified as a cell and its coordinates and coarse features are recorded. Processing of a signal and decisions are done in real time while the vessel containing that object is scanned in a continuous way.

After scanning the operator can instruct the device to return to recorded locations automatically. Fine features can then be extracted automatically at various microscopy modes. Repeated observations of cells can be performed. In case of live cells, studies of cell movement, cell growth, cell to cell interactions and the like are possible. Examinations of cells where changes of features are a function of time can be done automatically on a large number of cells in the same population.

The image sensor is preferably a solid state image sensor, for example a charge coupled device comprising a linear array of a large number of small photosensitive elements. It is desirable that the linear array can also be moved in such a way as to allow scanning of the magnified image. In this case the invention can additionally be used as a high resolution digitizing scanning camera.

It is desirable that in addition to the computer control of the precision microscope stage manual control be provided, for example by the use of a joy stick.

It is desirable that autofocus is provided for the system.

In a further aspect the present invention is a method of scanning and recognizing a microscopic object that comprises positioning the object on a motorized stage of a microscope having an image sensor in a focal plane; scanning mechanically and electronically the object; digitizing the signals received from the sensor during scanning; and processing the information contained in the signals.

DRAWINGS

Aspects of the invention are illustrated, merely by way of example, in the accompanying drawings in which.

DESCRIPTION OF THE PREFERRED EMBODIMENTS

Figure 1:
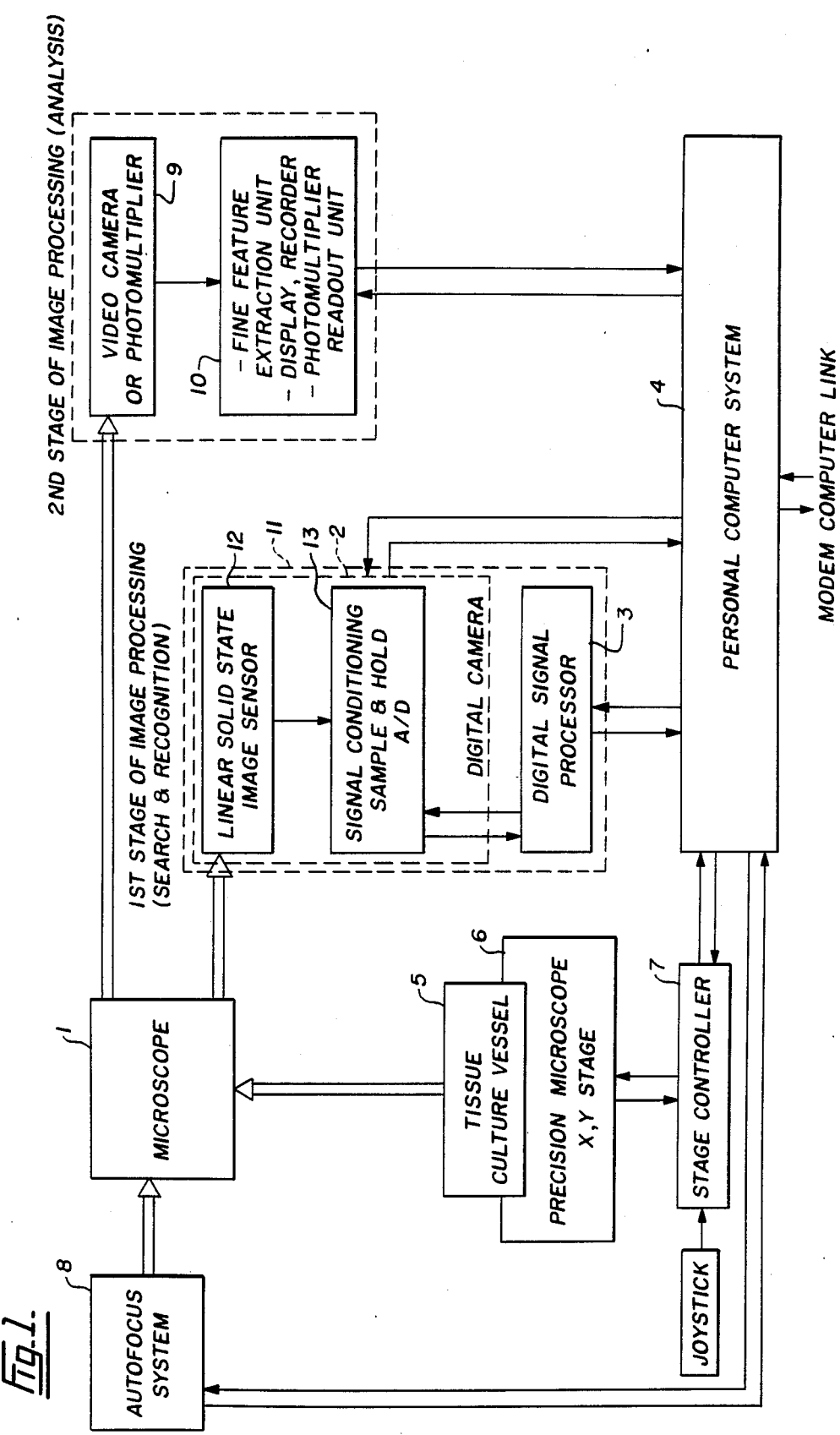
FIG. 1 is a schematic, block diagram showing the image scanner of the present invention.

Referring first to FIG. 1, the apparatus of the present invention comprises a standard microscope 1, electronic digitizing camera 2 which includes a solid state image sensor 12, a digital signal processor 3, a personal computer system 4, a tissue culture vessel 5, a precision microscope X,Y stage 6, a stage controller 7, fitted with a joy stick 7a, an autofocus system 8, a high resolution video camera or photomultiplier 9, fine feature extraction or photomultiplier readout or video display and optical memory disk recorder 10.

It should be emphasized that all the above components are commercially available items. For example the microscope may be that available under the trade mark Zeiss or Leitz. The solid state image sensor (CCD) may be that available from Fairchild or Reticon which includes signal conditioning and sample & hold circuitry. High speed analogue to digital converters (A/D) are easily available. Alternatively the line scan image sensing, the signal conditioning, the sample & hold and the A/D circuitry can be realized with an electronic digitizing camera, for example, as available from Datacopy. The high speed signal processor may be one available from Texas Instruments. The computer control precision microscope stage may be one with 1 $\mu$m resolution over a 10×10 cm$^2$ scanning area. Finally the computer may, for example, be that available under the trade mark IBM XT or AT Personal Computer. The optical memory disk recorder may be that available under the trade mark Panasonic OMDR.

Using the equipment of the present invention for the purpose of cell search and recognition, the microscope bright field image is sensed by a linear solid state image sensor 12. The image is sensed in a microscope camera port where the sensor is mounted in a focal plane of the microscope. The line scan image sensor signal is sampled and digitized with the signal conditioning, sample & hold and A/D circuitry 13, to produce a string of numbers representing one high resolution horizontal image line. In the illustrated embodiment the line scan image sensing 12 and the analogue digital conversion circuitry 13 is combined within the electronic digitizing camera 2, which may be attached to the microscope port in place of a standard camera.

The digital line image data are processed by high speed digital signal processor 3, which allows for coarse feature extraction and cell recognition. The cells to be found and recognized are plated into the tissue culture vessel 5, where the cells are attached to the bottom surface of the vessel. This vessel is positioned onto the precision X,Y microscope stage 6, driven by the microprocessor control stage controller 7, which also includes joy stick 7a for manual control of the stage. The autofocus system 8 allows for automatic focus adjustment. The electronic digitizing camera 2, the digital signal processor 3, the stage controller 7 and the autofocus 8 are all controlled by the computer system 4. Further analysis of cells at recorded locations can be performed by scanning the image at the same or changed microscopy modes with a linear solid state image sensor 12, which can be moved by a motor driven mechanism across the magnified image. Alternatively the second stage image processing 14 can be used. This provides options such as video camera with display, optical memory disk recorder, photomultiplier with readout or interactive video frame analysis system 9 and 10. This system may be used as well as the motor driven mechanism with the image sensor 12.

Figure 2:
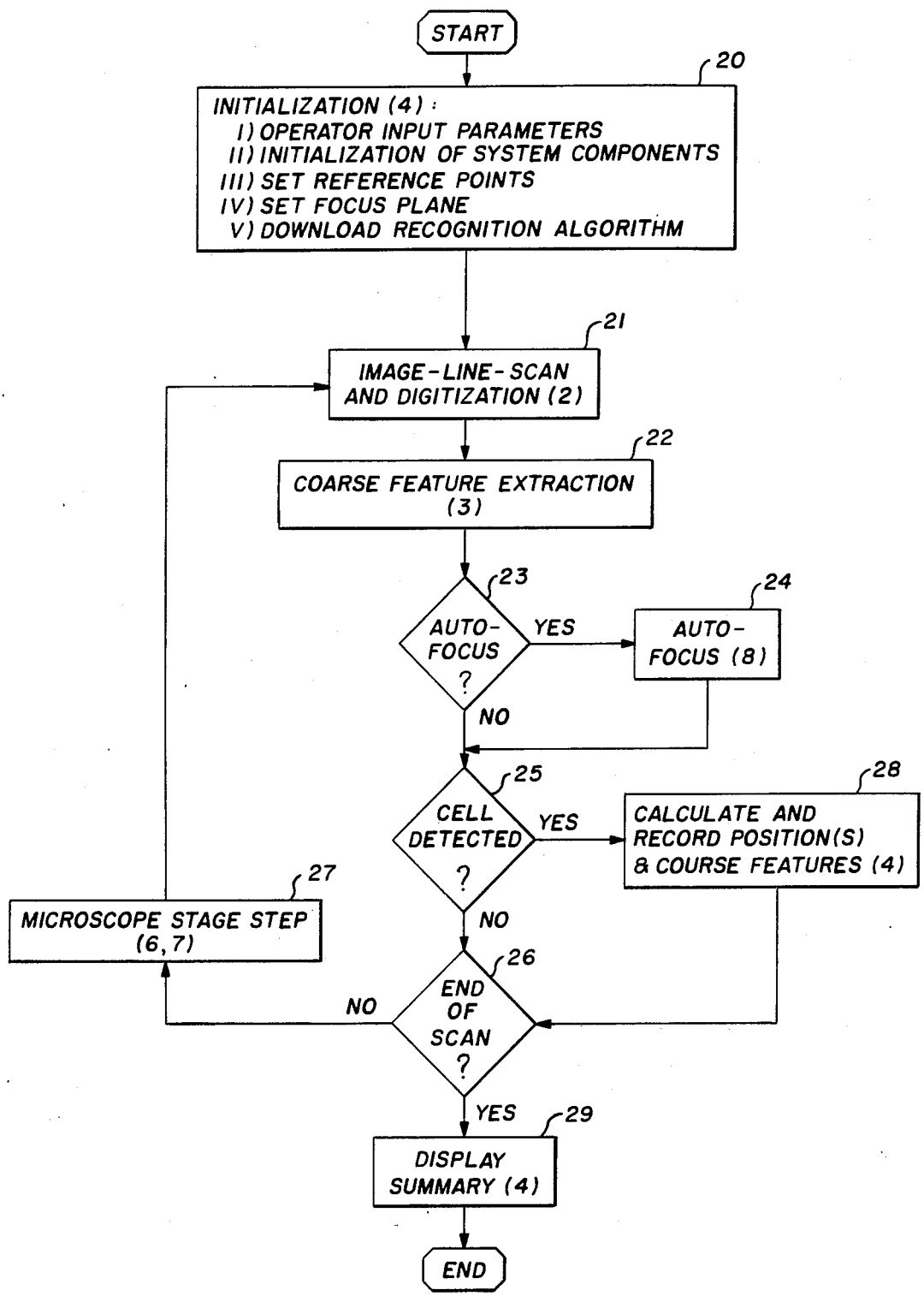
FIG. 2 is a simplified flow chart illustrating the operation of the scanner of the present invention.

FIG. 2 illustrates the basic algorithm for searching for objects in a vessel, recognizing cells, and recording positions and coarse features of those cells according to the invention. In an initializing stage 20 the operator enters various parameters such as area to be scanned, scanning speed, file name of output data file and the like. The operator also has a choice of what recognition algorithm is to be used and what is to be recorded. The electronic digitizing camera, the stage controller and the autofocussing system are then initialized. The reference points and the focal plane are determined and the appropriate recognition algorithm is down-loaded from the host computer to the digital signal processor.

After initialization the system enters into a high speed loop to scan an image line 21, to extract coarse features 22, and if required to adjust focus 23/24, to decide on cell presence or absence 25 and, to move the vessel by driving the microscope stage to the next image line 27. This sequence is repeated until the scan is finished. Quantization of each sensed pixel-pulse coincides with the solid stage image sensor's scanning rate to provide a real time digital signal which is processed before the next image line is scanned. If a cell is detected 25, the exact position of the cell center is calculated and the position and the desired coarse features are recorded 28. When the scan of the whole area is terminated 26, a summary of the scan is displayed 29 and the system is ready for the next scan.

According to the invention a high resolution linear solid state array scan across the approximate center of a cell contains enough information to recognize cells and certain subpopulations of cells, even at low microscope magnification. A typical scan of a CHO cell (Chinese hamster ovary cell, grown in vitro) as obtained by a linear solid state array is shown in FIG. 3.

Figure 3:
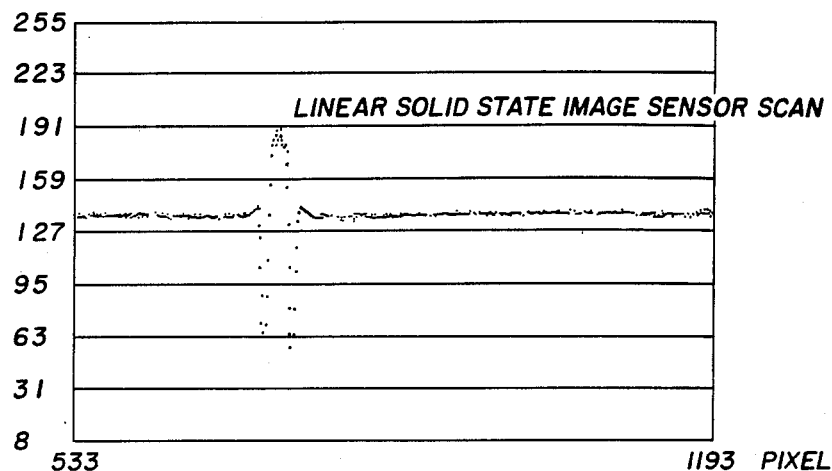
FIG. 3 illustrates a typical digital signal of a cell growing in a tissue culture achieved with the image scanner of the present invention.

FIG. 3 shows part of a digital signal as measured by the solid state image sensor across the approximate center of a CHO cell at low microscope magnification (6.3×3.2) using bright field microscopy. The sensor was mounted in a focal plane of the microscope and the cell image was projected onto the sensor.

The extracted features are derived from the signal which represents physical characteristics of cells (e.g., light scatter, refractive index, optical density), their geometrical nature (e.g., cell diameter, cell width, cell shape), and from mathematical transformations of the signal (Fast Fourier Transform, convolution, correlation, etc.).

After the coarse feature extraction of an image line, an object is represented by a feature vector. This vector can be normalized and evaluated using previously determined discriminant functions:

$$D_i = d_{i1}Z_1 + d_{i2}Z_2 + \ldots + d_{in}Z_n$$

where $$Z_j = \frac{F_j - \bar{F}_j}{\sigma_j}$$

and $F_j$ is the $j^{th}$ feature, $\bar{F}_j$ is the mean value of the $j^{th}$ feature, ($\sigma_j$ is the standard deviation of the $j^{th}$ feature and $d_{ij}$ is the $i^{th}$ object class ($i^{th}$ population) coefficient of the $j^{th}$ feature. The discriminant function and decision plane are determined by using a sample population of object classes and applying discriminant function analysis. This yields an optimal separation of object classes from one another using a minimum number of features.

There are other alternatives to arrive at a decision space. For example, in a two-dimensional case, as shown in FIG. 4, a rectangular decision space has been determined which was sufficient to discriminate CHO cells from debris.

Figure 4:
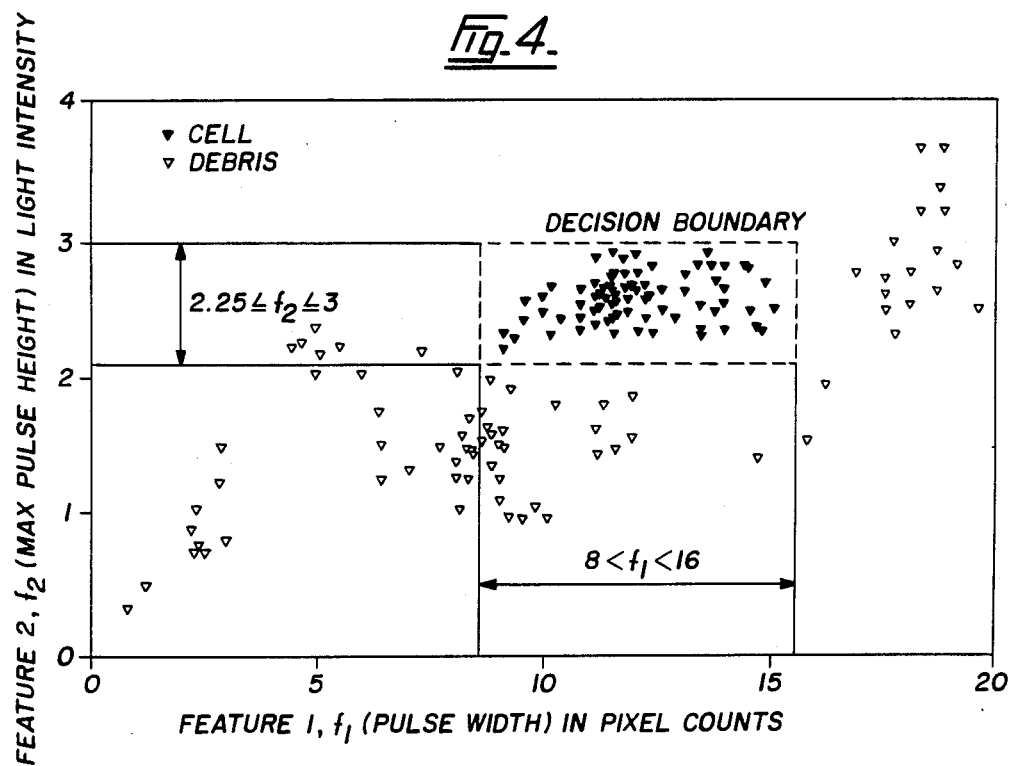
FIG. 4 shows further results achieved with the scanner of the invention.

FIG. 4 shows a 2-dimensional decision space for feature vector $F(f_1,f_2)$ for CHO-cell recognition. To obtain it CHO cells were plated into a tissue culture vessel in growth medium and incubated at 37° C. for one hour. Next, the tissue culture vessel bottom was scanned for cell-like objects and two simple features of the sensed object (pulse width, $f_1$, and maximum pulse height, $f_2$) were then plotted in a two dimensional space. All objects were then followed-up for several days. Using optical and tissue culture techniques live cells were identified by an observer (bold triangles). Using only the two features $f_1$ and $f_2$, all live cells were discriminated from the debris (open triangles).

The operation of the scanner of the invention is as follows:

Cells are plated into a vessel (e.g., tissue culture flask, petri dish, glass microscope slide, etc.) which can be filled by growth medium. They are then incubated under growth conditions until the cells settle to the bottom surface of the vessel. Reference points are marked on the vessel, the vessel is positioned on the microscope stage, the focal plane is determined, and various parameters are defined by the operator. After the desired magnification and microscopy mode are selected, the vessel is automatically scanned in the X, Y plane in a pre-programmed manner using the motorized stage and the linear solid stage image sensor. The Z-drive is used to control the focus which is automatically adjusted periodically. The coordinates and the coarse feature vector of all recognized cells are stored in a file in the memory of the host computer.

An area of up to $10 \times 10$ cm$^2$ can be scanned to locate cells in a few minutes with a minimum step size of 1 $\mu$m (typically 5 $\mu$m). Coordinates and coarse feature vectors of several thousand cells can be automatically determined within this time span. This is a conspicuous improvement over prior art scanners, which typically scan much smaller areas.

If required, each cell can be revisited automatically at any prescribed time for further observation and classification. On any subsequent visit, fine feature vectors can be extracted automatically, as the cell can now be observed at a higher magnification using a detailed scan by moving the linear solid state array across the magnified image of the cell instead of moving the stage with the specimen. In this way a higher resolution of the image is obtained. Alternatively (or in addition) a conventional videoframe analysis and editing system can be employed. A further possibility is to measure fluorescence using a photomultiplier once the location of the cells of interest have been determined by the image scanner. And finally, a high resolution television or solid stage imae frame can be stored using an optical memory disk recorder.

As to the system software, in addition to the cell search and cell recognition software there are a number of programmes to allow for a wide range of experiments using the image scanner of the invention as well as programs for data handling and display. These include:
calibration scanning program (for stage and optical scanner),
manual scanning program,
automatic scanning program (search and recognition),
coarse feature extraction programs,
classification program,
auto focussing program,
general image scanning program,
fine feature extraction program,
graphic programs (which include screen and printer/plotter displays),
feature evaluation programs, and
diagnostic programs.

The present invention provides a number of important technical advantages, which can be summarized as follows:
1. The solid stage image sensor allows one to scan a wide field and provides high image resolution, both spatially and photometrically.
2. The high horizontal image resolution given by the linear solid state image provides sufficient information for cell recognition whereas the variable vertical image line spacing can be at lower resolution which results in an image data reduction, typically by a factor of 10.
3. The scanning of the vessel is a continuous movement.
4. The digital signal processor yields a high speed image, line by line, processing in real time.
5. After a vessel is scanned and objects of interest are located the system has the ability to revisit automatically the objects once or many times for further analysis and fine feature extraction. Thus, many measurements of changes of features as a function of time and/or treatment are possible.
6. The simple modular design consisting of an electronic digitizing camera attachment to a microscope, a digital signal processor, a precision stage, and a control personal computer, provides a low cost system.

There are many potential applications in which the invention can be usefully employed. The following are some examples for uses with cells as plated in tissue culture vessels or on microscope slides.

1. Search and Find: Coarse Feature Extraction

Large areas can be automatically searched for cells with characteristic line signals. If cells are plated into a tissue culture flask or a microscope slide, several thousand cells can be located and characterized (by coarse feature vector) in a few minutes in an area as large as $10 \times 10$ cm$^2$. Once the locations of these cells are known, further observations can be done automatically if required. Cell size can be determined and in this mode the invention can be employed as a cell counter where cell size and cell shape distribution can readily be obtained.

2. Scan image: Fine Feature Extraction

After cells are found and located, the scanner can automatically return to these cells (with a precision of 1.5 $\mu$m in a $10 \times 10$ cm$^2$ stage or better for smaller area stages). Fine features of the object can be extracted by scanning the image of the object. This can be used to differentiate between various types of cells in a mixed cell population. It can also be used to determine, for example, in which phase of the cell cycle a particular cell resides. The maximum resolution of the fine feature vector depends on the microscope magnification and the digitizing equipment. For example, with one scanner prototype, the total information available is upto approximately 40 million bits per frame.

3. Changing microscopy mode

After cells have been found using a simple microscope setting at low magnification (e.g. bright field microscopy, 10 to 20× magnification), one can return to each recorded location and after changing microscopy mode (magnification, optical setting, etc.) the objects can be re-examined to fine new coarse and fine feature vectors. For example, fluorescence measurements associated with cells can be made. Qualitative and quantitative data can be obtained on a large population of cells in repeated observations. Distribution of fluorescence on individual cells can be determined. Another example of application is counting and analysis of cell colonies. Colonies of cells are first automatically located using a simple microscope mode (coarse feature vector) and then re-examined for colony characteristics (fine features of colonies) as well as individual cells (fine features of cells) which form the colonies. This is very useful in medical and in bioengineering applications.

4. Repeated observations: Coarse and Fine Features

A large population of cells can be examined repeatedly in a pre-determined time sequence. In the case of live cells, cell mobility, cell behavior, cell division, and other cell activities, can be measured automatically as a function of time and/or treatment.

5. Repeated observations: Trace of New Locations

If cells move as a function of time, the invention can be used to trace automatically the movements and motility of a large number of cells. For example, motility of live cells can be determined by either re-scanning the vessel repeatedly and finding new locations or after the first coarse scan, the cell displacement can be found by scanning the local image. The new coordinates can then be determined and various parameters of cell motility can be measured as a function of time.

6. Time-lapse Television Pictures

Automatic return to cells allows one to take high resolution television picture frames of each individual cell and store them in a prescribed manner to an optical memory disk recorder. These frames can then be recombined and viewed in any desired sequence under computer control such that time lapse cinematography television viewing of individual cells can be achieved.

This can be used, for example, in studies of cell differentiation, cell behavior, cell division, cell-to-cell interactions, etc. on a very large population of cells such that qualitative and quantitative data can be obtained. In cell differentiation studies, for example, one is able to reexamine cells which eventually make different types of colonies, thus the scanner could ideally be used to measure morphology and behavior of stem cells, particularly if one stores fine feature vectors of all cells.

7. Repeated Scans of the Same Vessel

Repeated scans of the same vessel could be used to find out emergence of characteristic cells and/or colonies as a function of time. This can be used for example in cell transformation studies where early automatic detection of transformed cells is possible.

We claim:

1. An image scanner for unstained live cells comprising:
    (a) an inverted microscope able to enhance scattered light rather than optical density with autofocus;
    (b) a precision computer controlled motor driven stage to provide X,Y plane displacements in order to position and scan cells under the microscope;
    (c) a solid state image sensor that comprises a linear charged coupled device array of photosensitive elements;
    (d) a digitizer in association with the microscope to sense a horizontal image line and provide a digital representation of the line;
    (e) a digital signal processor to process in real time digitized signals from the sensor; and
    (f) a computer to control the mechanical and electronic scanning and to store and display information from the digital signal processor.

2. Apparatus as claimed in claim 1 including a television camera.

3. Apparatus as claimed in claim 1 including an optical memory disk recorder.

4. Apparatus as claimed in claim 1 including a photo multiplier with a readout.

5. Apparatus as claimed in claim 1 in which the image sensor is part of a scanning camera providing precise movement and positioning of the linear solid state image sensor over the magnified image in a direction perpendicular to the linear extension of the array of photosensitive elements.

6. A method of scanning an area of at least several square centimeters to determine, recognize and locate live cells that comprises positioning the cells on a motorized stage of an inverted microscope with autofocus and having an image sensor in a focal plane;
    scanning the area by combining stage movement and electronic scanning of image lines by the sensor;
    digitizing directly the discrete signals received from the sensor during scanning;
    processing digitized signals with a digital signal processor in real time while scanning the area;
    deciding whether a processed signal belongs to a cell;
    using the signal to check and correct the focus of the inverted microscope before the next step; and
    storing the processed information contained in the signals.

7. A method as claimed in claim 6 in which the control of mechanical and electronic scanning, the control of processing and the storage and display of information is by computer.

8. A method as claimed in claim 6 comprising carrying out a coarse, rapid scan to locate desired cells in order to store coordinates and coarse features.

9. A method as claimed in claim 8 using bright field microscopy at low magnification to locate the desired cells.

10. A method as claimed in claim 8 comprising revisiting located, desired cells using the stored information.

11. A method as claimed in claim 10 comprising revisiting the desired cells to carry out a rapid examination of fine features with a different mode of microscopy from the coarse scan and by scanning in two dimensions in the magnified image of the desired cells.

12. A method as claimed in claim 11 in which the magnified image is scanned by a movable solid state image sensor or by a television camera.

13. A method as claimed in claim 10 in which the image is sensed by a photomultiplier fixed in the image plane, and scanned by moving the stage.

14. A method as claimed in claim 6 comprising making single line sweeps of the sensor across the cells.

15. A method as claimed in claim 6 including storing pictures of the object on an optical memory disk recorder, combining the stored pictures to provide cinematographic-like time sequences.

* * * * *